United States Patent
Anker et al.

(10) Patent No.: US 9,771,287 B2
(45) Date of Patent: Sep. 26, 2017

(54) WASTEWATER TREATMENT METHOD AND DEVICE

(75) Inventors: Yaakov Anker, Salit (IL); Erez Katz, Salit (IL)

(73) Assignee: Ariel Scientific Innovations Ltd., Ariel (IL)

(*) Notice: Subject to any disclaimer, the term of this patent is extended or adjusted under 35 U.S.C. 154(b) by 80 days.

(21) Appl. No.: 14/115,355

(22) PCT Filed: Jun. 5, 2012

(86) PCT No.: PCT/IB2012/000884
§ 371 (c)(1),
(2), (4) Date: Jan. 13, 2014

(87) PCT Pub. No.: WO2012/153174
PCT Pub. Date: Nov. 15, 2012

(65) Prior Publication Data
US 2014/0124438 A1 May 8, 2014

Related U.S. Application Data

(60) Provisional application No. 61/483,079, filed on May 6, 2011.

(51) Int. Cl.
*C02F 3/30* (2006.01)
*C02F 3/32* (2006.01)
(Continued)

(52) U.S. Cl.
CPC ............... *C02F 3/30* (2013.01); *C02F 3/302* (2013.01); *C02F 3/322* (2013.01);
(Continued)

(58) Field of Classification Search
CPC .. C02F 3/30; C02F 3/302; C02F 3/322; C02F 2101/20; C02F 2101/30; C02F 2103/005;
(Continued)

(56) References Cited

U.S. PATENT DOCUMENTS 2,658,310 A 11/1953 Cook
3,546,812 A * 12/1970 Kobayashi ............ A01G 33/00
210/602
(Continued)

FOREIGN PATENT DOCUMENTS

CA 2777567 5/2011
WO 02/34680 5/2002
(Continued)

OTHER PUBLICATIONS

Doucha et al., Productivity, CO2/O2 exchange and hydraulics in outdoor open high density microalgal (*Chlorella* sp.) photobioreactors operated in a Middle and Southern European climate. J. Appl. Phycol. vol. 18, pp. 811-826, 2006, DOI 10.1007/ s10811-006-9100-4.
(Continued)

*Primary Examiner* — Fred Prince
(74) *Attorney, Agent, or Firm* — The Law Office of Joseph L. Felber

(57) ABSTRACT

Installation and method for processing wastewater, comprising: a) providing wastewater for processing; b) reducing O2 content of said wastewater by unactivated aerobic digestion; c) subsequently to 'b', eliminating substantially all O2 from said wastewater by anaerobic digestion; d) subsequently to 'c', transferring said wastewater to a closed photobioreactor; and e) subsequently to 'd', maintaining said wastewater in said photobioreactor in conditions favorable for algal photosynthesis, thereby allowing algae to grow in said photobioreactor. A method for growing algae is also disclosed whereby time, density and flow speed are controlled. The photobioreactor may have a conduit with two proportions of different cross sections.

9 Claims, 6 Drawing Sheets

(51) Int. Cl.
    *C02F 101/20*    (2006.01)
    *C02F 101/30*    (2006.01)
    *C02F 103/00*    (2006.01)
    *C02F 103/20*    (2006.01)
    *C02F 103/32*    (2006.01)

(52) U.S. Cl.
    CPC ...... *C02F 2101/20* (2013.01); *C02F 2101/30* (2013.01); *C02F 2103/005* (2013.01); *C02F 2103/20* (2013.01); *C02F 2103/327* (2013.01); *C02F 2303/24* (2013.01); *Y02W 10/37* (2015.05)

(58) Field of Classification Search
    CPC ............ C02F 2103/20; C02F 2103/327; C02F 2303/24; Y02W 10/37
    USPC ................................. 210/602, 630, 252, 259
    See application file for complete search history.

(56) References Cited

U.S. PATENT DOCUMENTS

| | | |
|---|---|---|
| 3,645,040 A | 2/1972 | Ort |
| 3,780,471 A | 12/1973 | Ort |
| 3,973,043 A | 8/1976 | Lynn |
| 4,043,903 A | 8/1977 | Dor |
| 4,209,388 A | 6/1980 | DeFraites |
| 4,235,043 A | 11/1980 | Harasawa et al. |
| 4,253,271 A | 3/1981 | Raymond |
| 4,267,038 A | 5/1981 | Thompson |
| 4,324,067 A | 4/1982 | Kessler |
| 4,341,038 A | 7/1982 | Bloch et al. |
| 4,554,390 A | 11/1985 | Curtain et al. |
| 5,910,254 A | 6/1999 | Guelcher et al. |
| 5,981,271 A | 11/1999 | Doucha et al. |
| 6,000,551 A | 12/1999 | Kanel et al. |
| 6,156,561 A | 12/2000 | Kodo et al. |
| 6,180,376 B1 | 1/2001 | Liddell |
| 6,524,486 B2 | 2/2003 | Borodyanski et al. |
| 2002/0153303 A1* | 10/2002 | Oswald ................... C02F 1/70 210/603 |
| 2003/0213745 A1* | 11/2003 | Haerther ................... C02F 3/32 210/602 |
| 2005/0109695 A1* | 5/2005 | Olivier ................... A01K 63/04 210/605 |
| 2005/0269259 A1* | 12/2005 | Dunlop ..................... C02F 1/30 210/602 |
| 2008/0176304 A1 | 7/2008 | Lee |
| 2009/0269307 A1* | 10/2009 | Albers .................. A23L 1/3002 424/93.4 |
| 2010/0012580 A1 | 1/2010 | Ott |
| 2010/0288695 A1* | 11/2010 | Lawrence ................ C02F 3/02 210/602 |
| 2011/0023565 A1* | 2/2011 | Yanik ...................... C05F 11/00 71/11 |
| 2011/0253624 A1* | 10/2011 | Ewing .................... B01D 61/22 210/607 |
| 2011/0269220 A1* | 11/2011 | Van Slyke ............... A62D 3/02 435/262 |
| 2014/0342437 A1* | 11/2014 | Carpenter ................ C12N 1/20 435/252.4 |

FOREIGN PATENT DOCUMENTS

| | | |
|---|---|---|
| WO | 2005/033019 | 4/2005 |
| WO | 2011/068745 | 6/2011 |
| WO | 2012/019338 | 2/2012 |
| WO | 2014/072946 | 5/2014 |

OTHER PUBLICATIONS

Chaumont, Biotechnology of algal biomass production: a review of systems for outdoor mass culture, Journal of Applied Phycology vol. 5, pp. 593-604, 1993.
Written Opinion for PCT/IB2013/060004, dated May 8, 2015.
International Search Report and Written Opinion for PCT/IB2012/000884, dated Jan. 18, 2013.
Molinuevo-Salces et al., Performance comparison of two photobioreactors configurations (open and closed to the atmosphere) treating anaerobically degraded swine slurry, Bioresource Technology 101 (2010) 5144-5149.

* cited by examiner

WASTEWATER TREATMENT METHOD AND DEVICE

RELATED APPLICATION

This Application is a U.S. National Phase of PCT/IB2012/000884, having an international filing date of May 6, 2012, that was published on Nov. 15, 2012 as WO 2012/153174, which claims priority from U.S. Provisional Application No. 61/483,079, filed May 6, 2011, both of which are incorporated by reference as if fully set forth herein.

FIELD AND BACKGROUND OF THE INVENTION

The invention, in some embodiments, relates to the field of water treatment, and more particularly, but not exclusively, to methods and devices for treatment of carbon-containing aqueous waste.

Wastewater (i.e., carbon-containing aqueous waste) is water that contains contaminants including organic contaminants.

The amount of organic contaminants in wastewater is often expressed in terms of BOD or COD in units of mg/L. BOD (biological oxygen demand) is the mass of oxygen required for digestion of biodegradable contaminants in the wastewater by microorganisms. COS (chemical oxygen demand) is the mass of oxygen required for chemical oxidation of organic contaminants in the wastewater.

Total dissolved solids (TDS) in mg/L refers to minerals, salts, metals, cations, anions and small amounts of organic matter dissolved in the wastewater.

Total suspended solids (TSS) in mg/L refer to small suspended or colloidal particles that do not settle from the wastewater due to gravity alone.

In some cases, a measure of a specific type of contaminant, for example aromatic or metal content, in wastewater is also given.

Wastewater can be classified as untreated or raw (generally having a BOD>300 mg/L or a high chemical load) or as treated. Treated wastewater is wastewater that has been treated to have a certain organic contaminant level: Grade A: BOD<20 mg/L; Grade B: 20<BOD<150 mg/L; or Grade C: 150<BOD<300 mg/L.

Wastewater treatment is a process for removing contaminants from the wastewater to produce a liquid and a solid (sludge) phase, where the liquid phase in suitable for reuse or discharge, for example, being free of odors, suspended solids, and pathogenic bacteria There are a number of typical stages of large-scale wastewater treatment.

In an initial stage (primary treatment), the wastewater is clarified: floating solids and hydrophobic materials are removed, e.g., by raking or skimming, respectively, together with or followed by settling of sludge.

In a following stage (secondary treatment), most of the organic contaminants in the liquid effluent from the initial stage are removed, typically by biological digestion for example using aerobic bacteria, to biologically oxidise the organic contaminants. The resulting product settles as a coagulated mass (floc). To increase the rate of digestion, the wastewater is often activated (aerated) during the digestion process.

In a terminal stage (tertiary treatment), all but a negligible portion of bacterial matter and remaining organic contaminants are removed from the liquid effluent from the secondary treatment, usually by filtration over sand or activated carbon, to produce a liquid effluent that is water of a quality suitable for discharge or reuse.

Wastewater with chemical contaminants (e.g., from industrial processes) are sometimes treated by other (additional) methods, tailored for a specific type of contaminant.

The sludge from the primary and secondary treatment is typically isolated in batches in holding tanks for digestion by aerobic or anaerobic bacteria during which the gaseous by-products (e.g., $CH_4$) are collected for use as fuel. When digestion is complete, the remaining solids may be dried for use as an agricultural fertilizer component, incinerated, buried or disposed at sea.

It is known to use algae in wastewater treatment. Algae remove most contaminants associated with faeces and urine from sewage. Lipids useful as biofuels can be extracted from harvested algae.

The use of algae in wastewater treatment has been described, inter alia, in U.S. Pat. Nos. 2,658,310; 3,645,040; 3,780,471; 4,043,903; 4,209,388; 4,235,043; 4,253,271; 4,324,067; 4,341,038; 4,554,390; 5,910,254; 6,000,551; 6,156,561; 6,180,376; and 6,524,486.

Until closing down in May 2009, GreenFuel Technologies Corporation (Cambridge, Mass., USA) grew algae in a photosynthetic bioreactor fed with carbon dioxide emissions from a fossil fuel combustion source to produce fuels (methane, ethanol, biodiesel) and solids (for animal feed and bioplastics).

GreenShift Corporation (New York, N.Y., USA) has developed a bioreactor process that uses thermophilic cyanobacteria suspended in water to consume carbon dioxide emissions from a fossil fuel combustion source. The cyanobacteria consume the carbon dioxide and water, releasing oxygen and water vapour. The organisms also absorb nitrogen oxide and sulphur dioxide. Upon reaching maturity, the cyanobacteria settle to the bottom of the bioreactor for harvesting.

AquaFlow (Richmond, New Zealand), produces biofuel and fine chemicals from algae harvested from a municipal wastewater site in Blenheim, New Zealand. Harvested algae undergo a multistep process that includes concentration of algae into algal slurry, dewatering of the slurry to produce an algae paste which is refined.

SUMMARY OF THE INVENTION

A challenge in the art is processing wastewater to produce safer and/or more useful products. Some embodiments of the invention herein address this challenge by using bacterial digestion to convert wastewater to a fertile environment for algae growth, and then growing algae in the resulting fertile environment.

Accordingly, according to an aspect of some embodiments of the invention, there is provided a method for processing wastewater, comprising:
  a) providing wastewater for processing;
  b) reducing $O_2$ content of said wastewater by unactivated aerobic digestion;
  c) subsequently to 'b', eliminating substantially all $O_2$ from said wastewater by anaerobic digestion;
  d) subsequently to 'c', transferring said wastewater to a closed photobioreactor; and
  e) subsequently to 'd', maintaining said wastewater in said photobioreactor in conditions favorable for algal photosynthesis, thereby allowing algae to grow in said photobioreactor.

According to an aspect of some embodiments of the invention, there is also provided device suitable for processing wastewater, comprising:
- a closed unactivated aerobic digester having an inlet and an outlet;
- a closed anaerobic digester, having an inlet and an outlet, which inlet is in fluid communication with said outlet of said unactivated aerobic digester through an anaerobic digester inlet conduit; and
- a closed photobioreactor, having an inlet and an outlet, which inlet is in fluid communication with said outlet of said anaerobic digester through a photobioreactor inlet conduit.

According to an aspect of some embodiments of the invention, there is also provided a method for growing algae, comprising:
- for a period of time, exposing algae in a growth medium to sunlight, the growth medium including nutrients suitable for algal growth, $CO_2$ and devoid of viable aerobic bacteria;
- during the period of time, maintaining the density of the algae to not more than 25% by weight of the growth medium (weight ratio wet algae/growth medium 1:4)
- during said period of time, replenishing the nutrients and the $CO_2$; and
- during said period of time, alternatingly moving the algae together with the growth medium at a first speed for at least one continuous minute and at a second speed being slower than said first speed for at least one continuous minute, wherein said moving at a first speed occurs for at least 5% and not more than 40% of the period of time.

Some embodiments of the invention relate to methods and devices for processing wastewater that, in some aspects, have advantages over known methods and devices for the processing of wastewater. Some embodiments of the invention relate to methods and devices that employ algae to process wastewater, especially mixotrophic algae, as an Integrated Pollution Prevention and Control (IPPC) methodology with optional use of the redundant algae biomass to produce biofuel.

The method and device of the present invention, in at least some embodiments, use algae combined biological system for extraction of various pollutants from wastewater, with the option for biofuel production. The method and device, in at least some embodiments, rely on use of algae which occur naturally in the location of sewage treatment facilities.

Unless otherwise defined, all technical and scientific terms used herein have the same meaning as commonly understood by one of ordinary skill in the art to which the invention pertains. In case of conflict, the specification, including definitions, takes precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

Figure 1:
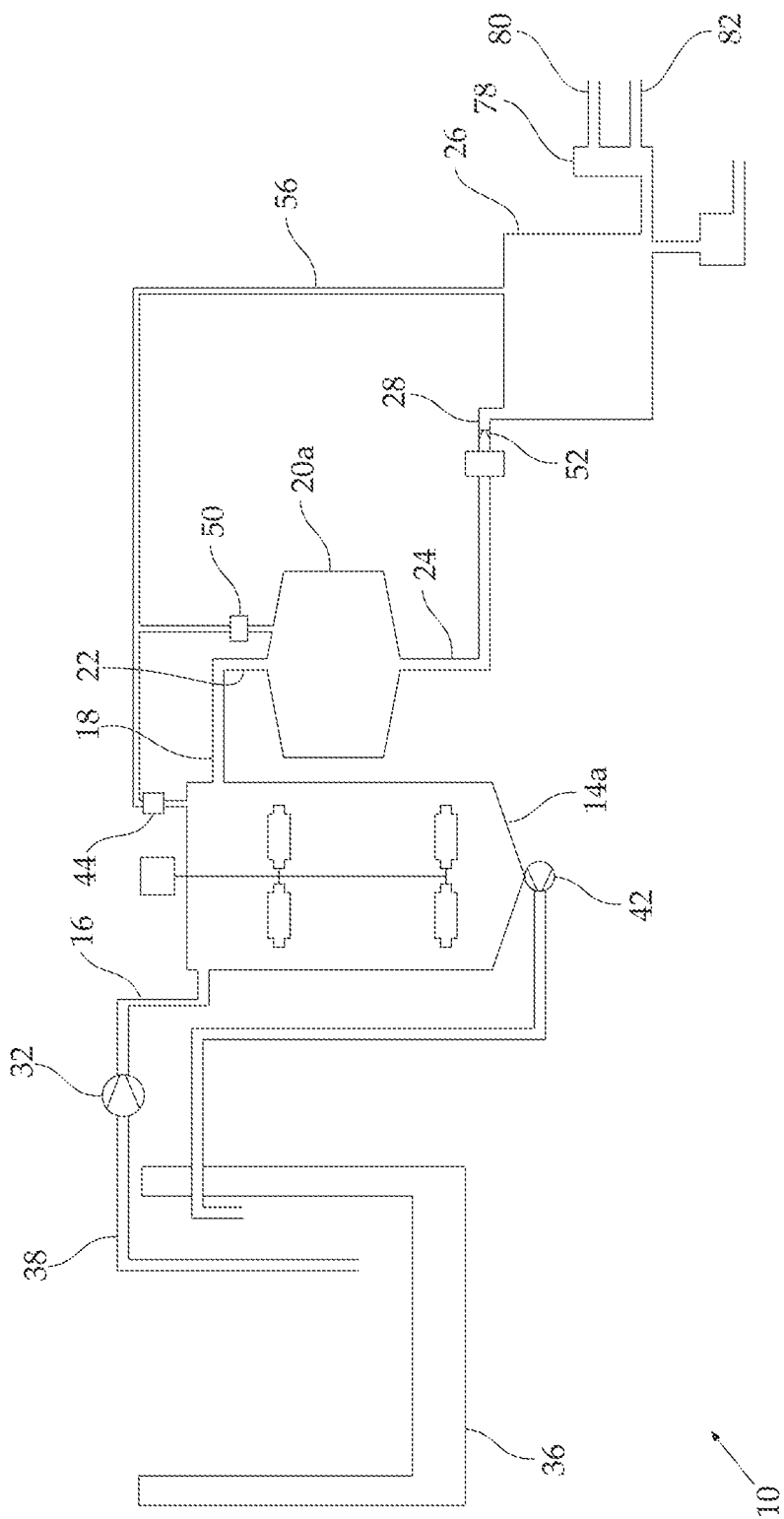
FIG. 1 is a schematic representation of a first embodiment 10 of a device according to the teachings herein.

The invention, in some embodiments thereof, relates to methods and devices for processing wastewater. Some embodiments of the invention relate to methods and devices that employ algae to process wastewater, in some embodiments photoautotrophic algae and in some embodiments mixotrophic algae, and use the resulting algae biomass to produce biofuel. In some embodiments, the method and device relate to IPPC, with negative total $CO_2$ emissions.

Some embodiments of the teachings herein achieve purification of wastewater together with production of biofuel, and eliminate challenges associated with excess algae in wastewater.

The principles, uses and implementations of the teachings of the invention may be better understood with reference to the accompanying description and figures. Upon perusal of the description and figures present herein, one skilled in the art is able to implement the teachings of the invention without undue effort or experimentation. In the figures, like reference numerals refer to like parts throughout.

Before explaining at least one embodiment of the invention in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

As noted above, a challenge in the art is processing wastewater to produce safer and/or more useful products. Some embodiments of the teachings herein address this challenge by using bacterial digestion to convert wastewater to a fertile environment for algal growth including dissolved $CO_2$ and suitable nutrients ($NH_3$, nitrites, nitrates, phosphates), and then growing algae in the resulting fertile environment.

Some embodiments of the teachings herein include treating the wastewater by unactivated aerobic digestion, followed by anaerobic digestion, followed by algal growth in a photobioreactor.

In unactivated aerobic digestion, aerobic and facultative organisms reduce the $O_2$ content in the wastewater and convert at least some of the waste in the wastewater into $CO_2$ and nutrients suitable for algal growth.

In anaerobic digestion, facultative and anaerobic organisms eliminate substantially all $O_2$ from the wastewater and convert at least some of the waste in the wastewater into $CO_2$ and nutrients suitable for algal growth, thereby converting the wastewater to a fertile environment for algal growth.

In algal growth in a photobioreactor (also called algal digestion), algae exposed to light consumes the $CO_2$ and nutrients in the wastewater to produce algal biomass, in preferred embodiments, in conditions that encourage photosynthesis at the expense of other forms of metabolism and/or that encourage algal lipid production and/or discourage lignin production.

Method for Processing Wastewater

According to an aspect of some embodiments of the teachings herein, there is provided a method for processing wastewater, comprising:
a) providing wastewater for processing;
b) reducing $O_2$ content of the wastewater by unactivated aerobic digestion;
c) subsequently to 'b', eliminating substantially all $O_2$ from the wastewater by anaerobic digestion;
d) subsequently to 'c', transferring the wastewater to a closed photobioreactor; and
e) subsequently to 'd', maintaining the wastewater in the photobioreactor in conditions favorable for algal photosynthesis (using sunlight), thereby allowing algae to grow in the photobioreactor.

Wastewater

The wastewater processed according to the teachings herein is any suitable wastewater. In some embodiments, the waste is sewage (blackwater) that generally is considered to, comprise about 99% water and about 1% organic compounds, but includes pathogenic bacteria and human faeces. In some embodiments, the wastewater is industrial wastewater; for example, waste that comprises about 95% water by weight and about 5% organic compounds (aliphatic and organic) as well as metals, including heavy metals. In some embodiments, industrial wastewater is from food processing and/or agriculture such as dairy farms since algae thrive in wastewater from these industries.

The salinity of the wastewater is any suitable salinity that does not substantially adversely affect the digesting organisms and algae. That said, household and industrial waste are typically fresh or brackish, typically having a TDS of between 400 and 1500 mg/L Pretreatment Similar to the known in the art, in some embodiments wastewater undergoes pretreatment prior to digestion.

In some embodiments, pretreatment includes separating of solids from the wastewater, e.g., stones, metal objects, large animal and plant remains. Such separating is performed using any suitable method, for example methods known in the art such as straining or raking of floating solids used in wastewater treatment.

In some embodiments, pretreatment includes crushing solid components of the wastewater, e.g., animal remains, plant remains and the like. Such crushing is performed using any suitable method, for example methods known in the art such as employing a crusher used in wastewater treatment.

Activated Aerobic Digestion

As noted above, according to the teachings herein, wastewater undergoes unactivated aerobic digestion allowing organisms (primarily aerobic organisms, especially aerobic bacteria) to reduce the $O_2$ content of the wastewater and to convert at least some of the waste in the wastewater into $CO_2$ and nutrients suitable for algal growth.

In some embodiments, the method further comprises prior to the reducing of the $O_2$ content of wastewater by unactivated aerobic digestion ('b'), reducing of the organic carbon content of the wastewater by activated aerobic digestion.

Activated aerobic digestion is aerobic digestion where the $O_2$ content of the wastewater is replenished during processing, typically by aeration. Activated aerobic digestion is well known in the art of wastewater treatment. Any suitable method of activated aerobic digestion may be used in implementing the teachings herein. Typically, activated aerobic digestion is performed in an aerobic digester (e.g., a fixed-film aerobic digester, a continuous-flow aerobic digester, a refluxed aerobic digester). In some embodiments, a fixed-bed of bacteria (sessile mode) is preferred to a floating-bed of bacteria (planktonic mode).

In typical implementations of the teachings herein, wastewater having a BOD of greater than 500 mg/L is treated by activated aerobic digestion prior to unactivated aerobic digestion, while wastewater having a BOD of less than 400 mg/L undergoes unactivated aerobic digestion without first undergoing activated aerobic digestion. Wastewater having a BOD of between 400 and 500 mg/L is treated with or without activated aerobic digestion prior to unactivated aerobic digestion depending on various factors such as cost of the required device, expected sunlight, expected outliers of BOD and the desired BOD for the purified water resulting from the method.

In this context, it is important to note that when the organic content of the wastewater transferred from the unactivated aerobic digestion to the anaerobic digestion is too high, the algae biomass recovered from the photobioreactor has a relatively high lignin content that is more likely to settle in the photobioreactor and is more difficult to ferment. For this reason amongst others, activated aerobic digestion prior to the unactivated aerobic digestion is preferred for high-organic (BOD greater than 500 mg/L) content wastewater.

Typically, wastewater transferred to the unactivated aerobic digestion subsequent to activated aerobic digestion has a BOD of between 20 and 30 mg/L.

Transferring Wastewater to Unactivated Aerobic Digestion

Wastewater is transferred to the unactivated aerobic digestion from the source of unprocessed wastewater, after the optional pretreatment and/or the optional activated aerobic digestion using any suitable method. In some embodiments, such transfer is performed by pumping. In some embodiments, the method is implemented as a substantially continuous process. In some such embodiments, the method comprises substantially continuously transferring wastewater to the unactivated aerobic digestion.

Unactivated Aerobic Digestion

According to the teachings herein, the $O_2$ content of the wastewater is reduced by unactivated aerobic digestion. The unactivated aerobic digestion can be considered an aerobic to anaerobic transition stage where the population of microorganisms in the wastewater changes from more aerobic microorganisms to fewer aerobic microorganisms.

In unactivated aerobic digestion (i.e. unaerated aerobic digestion) where no $O_2$ is added, aerobic and facultative organisms (mostly, if not entirely, bacteria) reduce the $O_2$ content in the wastewater and convert at least some of the waste in the wastewater into $CO_2$ and nutrients suitable for algal growth.

Unactivated aerobic digestion is well known in the art of wastewater treatment. Any suitable method of unactivated aerobic digestion may be used in implementing the teachings herein. In some embodiments devoid of activated aerobic digestion as described above, unactivated aerobic digestion is performed without mixing, in some embodiments using a plug-flow method. In some embodiments including an activated aerobic digestion as described above, unactivated aerobic digestion is performed using for example, a continuous stirred tank reactor.

As known in the art, unactivated aerobic digestion often leads to the formation of sludge that settles at the bottom of the unactivated aerobic digester. It is known to recover the settled sludge from some types of unactivated aerobic digesters. In some embodiments, the method further comprises recovering sludge settling during the unactivated aerobic digestion.

In some embodiments, the recovered sludge is subsequently digested by activated aerobic digestion. Accordingly, in some such embodiments, the method further comprises, digesting the recovered sludge by activated aerobic digestion.

Typically, the wastewater entering unactivated aerobic digestion has an $O_2$ content of between 3 and 8 mg/L, more typically between 3 and 6 mg/L. In some embodiments, the unactivated aerobic digestion is such that the $O_2$ content of the wastewater after the unactivated aerobic digestion is not more than 2 mg/L, typically between 0 and 2 mg/L, typically ~1 mg/L.

As noted above, wastewater transferred to the unactivated aerobic digestion subsequent to activated aerobic digestion typically has a BOD of between 20 and 30 mg/L. In some such embodiments, the unactivated aerobic digestion is such that the BOD of the wastewater after the unactivated aerobic digestion is between 0.10 and 20 mg/L.

Typically, wastewater transferred to the unactivated aerobic digestion without activated aerobic digestion has a BOD of up to 500 mg/L. In some such embodiments, the unactivated aerobic digestion is such that the BOD of the wastewater after the unactivated aerobic digestion is between 100 and 200 mg/L.

Any suitable microorganism may be used for implementing the unactivated aerobic digestion in accordance with the teachings herein. Due to the relatively low $O_2$ content and relatively high $CO_2$ content of the wastewater, the population of facultative organisms is typically more significant than the population of aerobic organisms. In some embodiments, the wastewater is seeded with one or more selected species of microorganisms to effect the unactivated aerobic digestion. That said, in some preferred embodiments, the unactivated aerobic digestion is effected by native microorganisms, that is to say, microorganisms present in the wastewater.

In some embodiments, the unactivated aerobic digestion is performed in a closed vessel, in some embodiments in a sealed vessel. In such a way, $O_2$ and other materials from the surroundings cannot enter the wastewater during the unactivated aerobic digestion and the gas (if present) above the wastewater during the unactivated aerobic digestion is substantially only gas released by the digestion.

In some embodiments, unactivated aerobic digestion is performed in a vessel at above-ambient pressure, typically 1% to 5% above ambient pressure.

The residence time of the wastewater in unactivated aerobic digestion is any suitable residence time sufficient to reduce the $O_2$ content to the desired level and depends on local factors. That said, in some typical embodiments, the residence time of wastewater in unactivated aerobic digestion is not less than 16 hours and even not less than 24 hours.

The unactivated aerobic digestion produces $CO_2$ that is dissolved in the wastewater. In some embodiments, $CO_2$ is released as a gas from the wastewater during the unactivated aerobic digestion. In some such embodiments, $CO_2$ released as a gas during the unactivated aerobic digestion is released, e.g., into the atmosphere. That said, in some preferred embodiments, the method further comprises recovering $CO_2$ gas released by the unactivated aerobic digestion, and in some such embodiments the method further comprises adding the recovered $CO_2$ gas to wastewater in the photobioreactor.

In some embodiments the anaerobic digestion produces $CH_4$ that is released as a gas. In some embodiments, at least some of the $CH_4$ produced is removed from the anaerobic reactor for burning.

In some embodiments, exhaust from an internal combustion engine or industrial process, typically in proximity to where the teachings herein are implemented is directed into the unactivated aerobic digestion. $O_2$ in the exhaust is consumed by the digestion, while $CO_2$ in the exhaust dissolves in the wastewater.

Transferring Wastewater from Unactivated Aerobic Digestion to Anaerobic Digestion Wastewater is transferred to the anaerobic digestion from the unactivated aerobic digestion using any suitable method.

In some embodiments, such transfer is performed by pumping.

In some embodiments, such transfer is performed by displacement, wherein wastewater from the unactivated aerobic digestion is displaced to the anaerobic digestion by wastewater transferred to the unactivated aerobic digestion.

In some embodiments, the method comprises substantially continuously transferring wastewater from the unactivated aerobic digestion to the anaerobic digestion, in some embodiments at a rate substantially equal to the rate of transfer of wastewater to the unactivated aerobic digestion.

Anaerobic Digestion

In anaerobic digestion according to the teachings herein, facultative and anaerobic organisms (mostly, if not entirely, bacteria) eliminate substantially all remaining $O_2$ from the wastewater and convert at least some of the waste in the wastewater into $CO_2$ and nutrients suitable for algal growth, thereby converting the wastewater to a fertile environment for algal growth.

Anaerobic digestion is well known in the art of wastewater treatment. Any suitable method of anaerobic digestion may be used in implementing the teachings herein. In some embodiments, anaerobic digestion is performed without mixing using a plug-flow method, for example employing a vertically stratified anaerobic digester without mixing, where wastewater from the unactivated aerobic digestion enters the top of the anaerobic digester and, after treatment, is removed from the bottom of the anaerobic digester. Such anaerobic digestion leads to stratification of the wastewater where the lower in the digester, the lower the concentration of $O_2$ and living aerobic microorganisms, and the greater the concentration of anaerobic microorganisms, $CO_2$ and remains of dead aerobic microorganisms. In some embodiments, such a vessel includes bacterial growth substrates (e.g., mats) allowing the bacteria to adopt a sessile mode during anaerobic digestion.

In preferred embodiments, the anaerobic digestion is such that the population of aerobic microorganisms in the wastewater is no longer viable (typically entirely eliminated) by the conditions of the anaerobic digestion. By no longer viable is meant that the population is no longer able to substantially develop even when placed in the conditions favorable to aerobic growth found in the photobioreactor. Although not wishing to be held to any one theory, it is currently believed that during anaerobic digestion, aerobic microorganisms are killed by toxic compounds released during anaerobic digestion or are consumed by facultative and/or anaerobic microorganisms present during anaerobic digestion. Accordingly, in some embodiments, the anaerobic digestion is such that that subsequent to the anaerobic digestion the population of aerobic microorganisms in the wastewater is no longer viable.

Any suitable microorganism may be used for implementing the anaerobic digestion in accordance with the teachings herein. In some embodiments, the wastewater is seeded with one or more selected species of microorganisms to effect the anaerobic digestion, for example species designed or selected to digest specific industrial pollutants found in the wastewater. That said, in some preferred embodiments, the anaerobic digestion is effected by native microorganisms, that is to say, microorganisms present in the wastewater.

In some embodiments, the anaerobic digestion is performed in a closed vessel, in some embodiments in a sealed vessel. In such a way, $O_2$ and other materials from the surroundings cannot enter the wastewater during the anaerobic digestion and the gas (if present) above the wastewater during the anaerobic digestion is substantially only gas released by the digestion.

In some embodiments, anaerobic digestion is performed in a vessel at above-ambient pressure, typically 1% to 5% above ambient pressure.

The residence time of the wastewater in the anaerobic digestion is any suitable residence time sufficient to eliminate all the remaining $O_2$ content, which depends on local factors. That said, in some typical embodiments, the residence time of wastewater in anaerobic digestion is not less than 16 hours and even not less than 24 hours.

As noted above, in some embodiments wastewater transferred to the anaerobic digestion subsequent to unactivated aerobic digestion has a BOD of between 10 and 20 mg/L. In some such embodiments, the anaerobic digestion is such that the BOD of the wastewater after the anaerobic digestion is between 5 and 10 mg/L.

In some embodiments, wastewater transferred to the anaerobic digestion subsequent to unactivated digestion has a BOD of between 100 and 200 mg/L. In some such embodiments, the anaerobic digestion is such that the BOD of the wastewater after the anaerobic digestion is between 20 and 30 mg/L.

The anaerobic digestion produces $CO_2$ that is dissolved in the wastewater. In some embodiments, $CO_2$ is released as a gas from the wastewater during the anaerobic digestion. In some such embodiments, $CO_2$ released as a gas during the anaerobic digestion is released, e.g., into the atmosphere. That said, in some preferred embodiments, the method further comprises recovering $CO_2$ gas released by the anaerobic digestion, and in some such embodiments the method further comprises adding the recovered $CO_2$ gas to wastewater in the photobioreactor.

In some embodiments the anaerobic digestion produces $CH_4$ that is released as a gas. In some embodiments, at least some of the $CH_4$ produced is removed from the anaerobic reactor for burning.

Transferring Wastewater from Anaerobic Digestion to Photobioreactor

Wastewater is transferred to the photobioreactor from the anaerobic digestion using any suitable method.

In some embodiments, such transfer is performed by pumping.

In some embodiments, such transfer is performed by displacement, wherein wastewater from the anaerobic digestion is displaced to the photobioreactor by wastewater transferred to the anaerobic digestion (e.g., from the unactivated aerobic digestion).

In some embodiments, the method comprises substantially continuously transferring wastewater from the anaerobic digestion to the photobioreactor, in some embodiments at a rate substantially equal to the rate of transfer of wastewater to the anaerobic digestion.

In some embodiments, the rate of transfer of wastewater from the anaerobic digestion to the photobioreactor is independent of the rate of transfer of wastewater to the anaerobic digestion. For example, in some embodiments, wastewater is transferred to the photobioreactor only when there is sufficient sunshine for efficient algal growth. In such embodiments, the anaerobic digestion acts as a reservoir holding excess wastewater until such can be transferred to the photobioreactor.

Algal Growth in Photobioreactor

Subsequent to the anaerobic digestion, the wastewater is transferred to a closed photobioreactor, and the wastewater is maintained in the photobioreactor in conditions favorable for algal photosynthesis, thereby allowing algae to grow in the photobioreactor. The algae are exposed to light and consume the $CO_2$ and nutrients in the wastewater to produce algal biomass and to provide purified water, preferably suitable for discharge into the environment.

In order to maximize the conversion of $CO_2$ and nutrients to algal biomass, allowing maximal production of lipids, it is preferred that the algae grow in the photobioreactor without competition from other microorganisms. Accordingly, the photobioreactor is closed, and in some embodiments sealed to prevent microorganisms from the surroundings from entering the photobioreactor.

As noted above, the wastewater entering the photobioreactor is a fertile environment for algal growth, and as such, also for other microorganisms. Additionally, the algae in the photobioreactor release $O_2$ into the wastewater. Potentially, aerobic microorganisms such as bacteria can thrive in the photobioreactor, reducing the produced algal biomass by competition for nutrients and/or by consuming the algae. Further, some such microorganisms are potentially pathogenic so if these develop, render water extracted from the photobioreactor unsafe for discharge into the environment. Accordingly, it is advantageous that the population of aerobic microorganisms in the wastewater entering the photobioreactor is no longer viable.

Additionally, in preferred embodiments, the conditions in the photobioreactor are such that the population of microorganisms in the wastewater from the anaerobic digestion is no longer viable (typically entirely eliminated) as a result of the transfer and/or maintaining of the wastewater in the photobioreactor. By no longer viable is meant that the population is no longer able to substantially develop even when placed in conditions favorable to anaerobic growth. Although not wishing to be held to any one theory, it is currently believed that the population of microorganisms in the wastewater from the anaerobic digestion is no longer viable (typically entirely eliminated) as a result of the transfer of the wastewater from the anaerobic digestion to the photobioreactor, and the concomitant sudden exposure to conditions of light and/or relatively high $O_2$ content and/or the presence of microorganisms symbiotic (e.g., protozoa) with the algae. Accordingly, in some embodiments, the conditions during the transfer to the photobioreactor or during the maintaining in the photobioreactor are such that the population of microorganisms from the anaerobic digestion in the wastewater is no longer viable.

In some embodiments, the photobioreactor is operated at above ambient pressure, typically 1% to 5% above ambient pressure. Such pressure helps prevent contamination of the contents of the photobioreactor with bacteria from the surroundings.

In some embodiments, the photobioreactor includes a vent allowing escape of gases produced during the processing of the wastewater in the photobioreactor. In some embodiments, the photobioreactor includes a one-way valve (e.g., check valve) that allows escape of gases from the photobioreactor but prevents gases and contaminants from the surroundings from entering the photobioreactor.

Any suitable algae may be used for implementing algal growth in the photobioreactor in accordance with the teachings herein. In some embodiments, the algae are mixotrophic and/or photoautotrophic. Although in some embodiments, the algae are of a single species, in some preferred embodiments the algae are of multiple (at least two different) species, e.g., a combination of both *Scenedesmus* and *Nitzschia*.

In some embodiments, the wastewater is seeded with one or more selected species of algae, for example algae having desired, properties, for example, exceptional ability to trap specific pollutants such as heavy metals found in the wastewater.

That said, in some preferred embodiments, the algae in the photobioreactor are native algae, that is to say, algae present in the wastewater, typically *Scenedesmus* and *Nitzschia*. It has been found that in some embodiments algae spores found in wastewater are able to survive activated aerobic digestion, unactivated aerobic digestion and anaerobic digestion.

Preferably, the wastewater is maintained in conditions favorable for algal photosynthesis. In some preferred embodiments, the conditions are such that encourage photosynthesis at the expense of other forms of metabolism and/or that encourage algal lipid production and/or discourage lignin production and/or discourage algal settling. Specifically, it is preferable that the algae population be predominantly or entirely microalgae, planktonic algae as opposed to sessile mode, as close as possible to unicellular with as little as possible incidence of colony formation. Although not wishing to be held to any one theory, it is believed that in such a state one or more of: the wastewater remains relatively clear with little light scattering so that more light is used for photosynthesis; the cell walls remain relatively thin so light more effectively penetrates into the cell for photosynthesis; the cells have a higher lipid content relative to cellulose content; the cells have a relatively low lignin content relative to cellulose content; the wastewater is more fluid and less viscous; and there is a reduced chance of clogging of the photobioreactor. At the same time, it is preferred that the algae grow in conditions that discourage swimming behavior and development of swimming organs that expend lipids that are otherwise harvested. It is also preferred that the algal growth purifies the water so that water isolated from the photobioreactor be of sufficient quality to allow discharge to the environment.

$CO_2$ is a green-house gas that is typically released into the atmosphere, in some instances at a cost. It is preferable, both for environmental and economic reasons to sequester rather than release $CO_2$. Further, a lack of $CO_2$ in the wastewater of the photobioreactor may potentially induce some algae to adopt non-photosynthetic metabolism (e.g., respiratory metabolism) while sufficient $CO_2$ in the wastewater may support photosynthetic metabolism of the algae. Accordingly, in some embodiments, the method as described herein further comprises adding $CO_2$ gas to the wastewater in the photobioreactor. In some embodiments, the $CO_2$ is $CO_2$ recovered from the unactivated aerobic digestion. In some embodiments, the $CO_2$ is $CO_2$ recovered from the anaerobic digestion. In some embodiments, the $CO_2$ is from some other source, for example, from the exhaust of an internal combustion engine or effluent of an industrial process, typically in proximity to where the teachings herein are implemented.

In some embodiments, $CO_2$ is isolated (e.g., by distillation) from some source for example, from the exhaust of an internal combustion engine or industrial process, typically in proximity to where the teachings herein are implemented and the relatively-pure $CO_2$ added to the photobioreactor.

To ensure that the algae receive sufficient sunlight it is preferred that the optical path through the photobioreactor be as short as possible, that is to say the light collectors of the photobioreactor be thin. However, to ensure that a photobioreactor has sufficient volume to hold a useful amount of wastewater to absorb a significant proportion of the sunlight and to reduce sensitivity to clogging, it is preferred that the optical path through the photobioreactor be not too short. Accordingly, in some embodiments, the optical path through the photobioreactor is not less than 0.5 cm, not less than 0.8 cm and even not less than 1 cm and not more than 5 cm, not more than 4 cm, not more than 3 cm and even not more than 2.5 cm.

If the density of the algae in the wastewater in the photobioreactor is too great, light will be quickly absorbed or scattered by algae closer to the source of light (algae closer to the sun) thereby shading algae further from the sun. Additionally, a high density increases the viscosity of the wastewater, potentially encourages colony behavior of some algae species (e.g., of *Scenedesmus*), increasing the chance of clogging the photobioreactor and also potentially inducing some algae to adopt non-photosynthetic metabolism. Accordingly, in some embodiments, the algal density is maintained (e.g., by harvesting, for example with a skimmer, or an Archimedean screw) at not greater than 25%, not greater than 22% and even not greater than 20% (weight percent of wet algae to wastewater) densities found to yield acceptable results.

That said, if the density of the algae in the wastewater in the photobioreactor is too low, the algae is potentially unable to effectively process the wastewater so that water isolated from the photobioreactor be of sufficient quality to allow discharge to the environment. Accordingly, in some embodiments, the algal density is maintained at not less than 10%, not less than 12% and even not less than 15% (weight percent of wet algae to wastewater) densities found to yield acceptable results.

If the wastewater is static or flows too slowly in the photobioreactor, the algae potentially settle and form colonies clogging the photobioreactor, making algae harvesting difficult and making maintaining a desired population density challenging. Species or forms of algae (e.g., filamentous algae, mat-building algae) having relatively low lipid content, thicker cellulose-rich cell walls and/or a high lignin content may potentially develop. That said, if the wastewater flows too quickly through the photobioreactor, the algae undergo excessive stress, fail to develop and even die. Some specie, develop swimming organs and, instead of storing lipids, use the lipids for swimming.

Accordingly, it has been found to be advantageous to ensure that the wastewater in the photobioreactor does not flow too slowly but also not too quickly to avoid the negative effects of either extreme. In some embodiments, the wastewater is discontinuously circulated, that is to say, undergoes periods of flow, followed by periods of no flow. In some embodiments, the wastewater is substantially continuously circulated in the photobioreactor. In some such embodiments, the wastewater is substantially continuously circulated in the photobioreactor at varying rates. Thus, in some embodiments, the method further comprises during the maintaining of the wastewater in the photobioreactor, at least one of circulating the wastewater in the photobioreactor discontinuously and circulating the wastewater in the photobioreactor continuously.

In some embodiments, the rate of driving of the flow (e.g., with a circulation pump) is varied over time to circulate the wastewater in the photobioreactor discontinuously or at varying rates.

That said, in some embodiments, the photobioreactor constitutes a conduit, having:
at least one portion of a first (larger) cross section; and
at least one portion of a second cross section which is smaller in size than the first cross section
allowing a given alga to experience circulation through the photobioreactor at changing rates while maintaining substantially constant driving of flow over time, where:
flow through portions having the first cross section is at a first rate; and
flow through portions having the second cross section is at a second rate faster than the first rate.

What is considered faster and slower flow rates as well as durations of each type of flow to ensure optimal results is system specific and must be determined experimentally on a per-site basis. That said, it has been found that without undue effort, the teachings herein may be implemented to grow algae (of "normal" species such as green algae (e.g., *Scenedesmus*) and diatomic algae (e.g., *Nitzschia*) having a 2:1 and even 7:3 lipid/cellulose ratio.

Although methods of the teachings herein may be implemented as batch processes, in some embodiments it is preferred that the methods be implemented as substantially continuous processes, allowing high-throughput to process large amounts of wastewater. Accordingly, in some embodiments the method is a continuous method In some such substantially continuous processes, wastewater from the anaerobic digestion is transferred to the photobioreactor, so a substantially similar amount of processed water must be removed from the photobioreactor. Accordingly, in some embodiments, the method further comprises substantially continuously removing processed water from the photobioreactor, in some embodiments at a rate substantially equal to the rate of transfer of wastewater from to anaerobic digestion to the photobioreactor.

In some such substantially continuous processes, it is typically necessary to harvest algae, preferably continuously, both for maintaining a desired algal density in the photobioreactor and for the sake of harvesting the algae. Accordingly, in some embodiments, the method further comprises harvesting algae from the photobioreactor, in some embodiments thereby maintaining a desired algal density in the photobioreactor.

The teachings herein are preferably implemented using sunlight for the algal photosynthesis. Depending on factors such as the location, the season and the weather where the teachings herein are implemented, there are significant periods of time (e.g. night) when there is insufficient light to support sufficient photosynthesis.

In some embodiments, the method further comprises when there is insufficient sunlight to support sufficient photosynthesis, stopping the transfer of wastewater from the anaerobic digestion to the photobioreactor. In some such embodiments, the method also comprises stopping the transfer of wastewater from the unactivated aerobic digestion to the aerobic digestion.

In order to avoid that the algae in the photobioreactor adopt non-photosynthetic metabolism (e.g., respiratory metabolism) in some embodiments the method further comprises when there is insufficient sunlight to support sufficient photosynthesis (that is to say, the intensity of sunlight is low so that a non-negligible portion of the algae tends to adopt non-photosynthetic metabolism), illuminating the wastewater in the photobioreactor with artificial light. The intensity of the artificial light is sufficient to help avoid algae adopting non-photosynthetic metabolism.

In order to avoid that the algae settle in the photobioreactor, in some embodiments the method further comprises, when there is insufficient sunlight to support sufficient photosynthesis, circulating the wastewater in the photobioreactor, substantially as described above, that is to say discontinuously or continuously, at a rate sufficient to help avoid algae settling in the photobioreactor.

As noted above, embodiments of the teachings herein provide a method for converting a toxic and dangerous waste material (wastewater), relatively cheaply and easily using primarily sunlight to generate two useful products: water of sufficient quality allowing discharge into the environment and algal biomass, that in some embodiments includes unusually high levels of lipids.

Accordingly, in some embodiments the method further comprises harvesting algal biomass from the photobioreactor. Accordingly, in some embodiments, the method further comprises removing water from the photobioreactor.

In some embodiments, water removed from the photobioreactor is sufficiently purified (metals, especially heavy metals are found in the algal biomass; most if not all toxic materials are digested; pathogens and bacteria, killed) to be discharged into the environment, e.g., used for irrigation in agriculture or gardening or for consumption by livestock. In some embodiments, water removed from the photobioreactor is filtered (for example, using geotechnical cloth, to remove algae) prior to further use or discharge. In some embodiments, water removed from the photobioreactor is irradiated with ultraviolet light to destroy algae spores prior to further use or discharge. In some embodiments, water removed from the photobioreactor is passed through a sand trap to remove, algae and/or destroyed algal spores, prior to further use or discharge.

As noted above, in some embodiments wastewater transferred to the photobioreactor subsequent to anaerobic digestion has a BOD of between 5 and 10 mg/L. In some such embodiments, the purified water removed from the photobioreactor has a BOD of between 2 and 5 mg/L.

As noted above, in some embodiments wastewater transferred to the photobioreactor subsequent to anaerobic digestion has a BOD of between 20 and 30 mg/L. In some such embodiments, the purified water removed from the photobioreactor has a BOD of between 2 and 10 mg/L.

The algal biomass may be harvested using any suitable method or device, preferably continuously, and preferably at a rate that is dependent on the rate of algal growth to maintain the algae population in the wastewater in the photobioreactor at a desired density.

In some embodiments, the algal biomass is harvested and discarded or used, for example, as animal feed (livestock, aquaculture) or fertilizer.

In some embodiments, the algal biomass is harvested and separated to lipids (e.g., for use as biodiesel) and cellulose (e.g., for fuel, digestion or fermentation to bioethanol). Due to the conditions selected for encouraging photosynthetic metabolism and planktonic modes while discouraging non-photosynthetic metabolism, settling, sessile modes and development of colonies and swimming behaviors, as noted above, in some embodiments the lipid content in the algal biomass is unusually high and the lignin content is relatively low.

Separation of the algal biomass into a lipid stream and a solid (cellulose and lignin) stream can be performed in any suitable fashion, for example as known in the art. For example, in some embodiments, the algal biomass is sonicated to rupture cell walls and centrifuged with a carrier (dichloroethane, dichloromethane, acetone, freon) to separate the streams. In some embodiments, such separation is relatively easy due to the relatively thin cell walls of the algal biomass. As a result of the centrifugation, the algal biomass, is separated into a lipid layer, a solid material layer, a water layer and a mineral layer (typically including $SiO_2$ from diatomic algae and/or $CaCO_3$ from green algae).

As known in the art, the lipid stream may be used, for example, for manufacture of biodiesel. In some embodiments, isolation of the lipid stream and use thereof as fuel is done locally, to generate power to implement the teachings herein. In some embodiments, heavy metals from the wastewater are found in the lipid stream. Generally, the concentration of heavy metals is lower than the maximum accepted for mineral diesel fuel and can be used without further processing.

As known in the art, the solid stream may be used, for example, as animal feed, or as a fertilizer, may be burnt (as a fuel or for disposal), or more typically may be fermented for the manufacture of bioethanol. In some embodiments, the dearth of lignin in the solid stream makes fermentation exceptionally advantageous. In some embodiments, heavy metals from the wastewater are found in the solid stream.

The methods according to the teachings herein may be implemented by using any suitable device or combination of devices. That said, in some embodiments, it is preferred to implement such methods using an embodiment of a device in accordance with the teachings herein.

Device Suitable for Processing Wastewater

According to an aspect of some embodiments of the teachings herein, there is provided a device suitable for processing wastewater, comprising:

a closed unactivated aerobic digester having an inlet and an outlet, suitable for reducing the $O_2$ content of wastewater by unactivated aerobic digestion;

a closed anaerobic digester, having an inlet and an outlet, which inlet is functionally associated with the outlet of the unactivated aerobic digester (allowing fluid exiting the outlet of the unactivated aerobic digester to pass into the anaerobic digester through the inlet of the anaerobic digester), the anaerobic digester suitable for eliminating substantially all $O_2$ from wastewater by anaerobic digestion; and a closed photobioreactor, having an inlet, which inlet is functionally associated with the outlet of the anaerobic digester (allowing fluid exiting the outlet of the anaerobic digester to pass into the photobioreactor through the inlet of the photobioreactor), the photobioreactor suitable for maintaining wastewater in conditions favorable for algal photosynthesis using sunlight, thereby allowing algae to grow in the photobioreactor.

Figure 2:
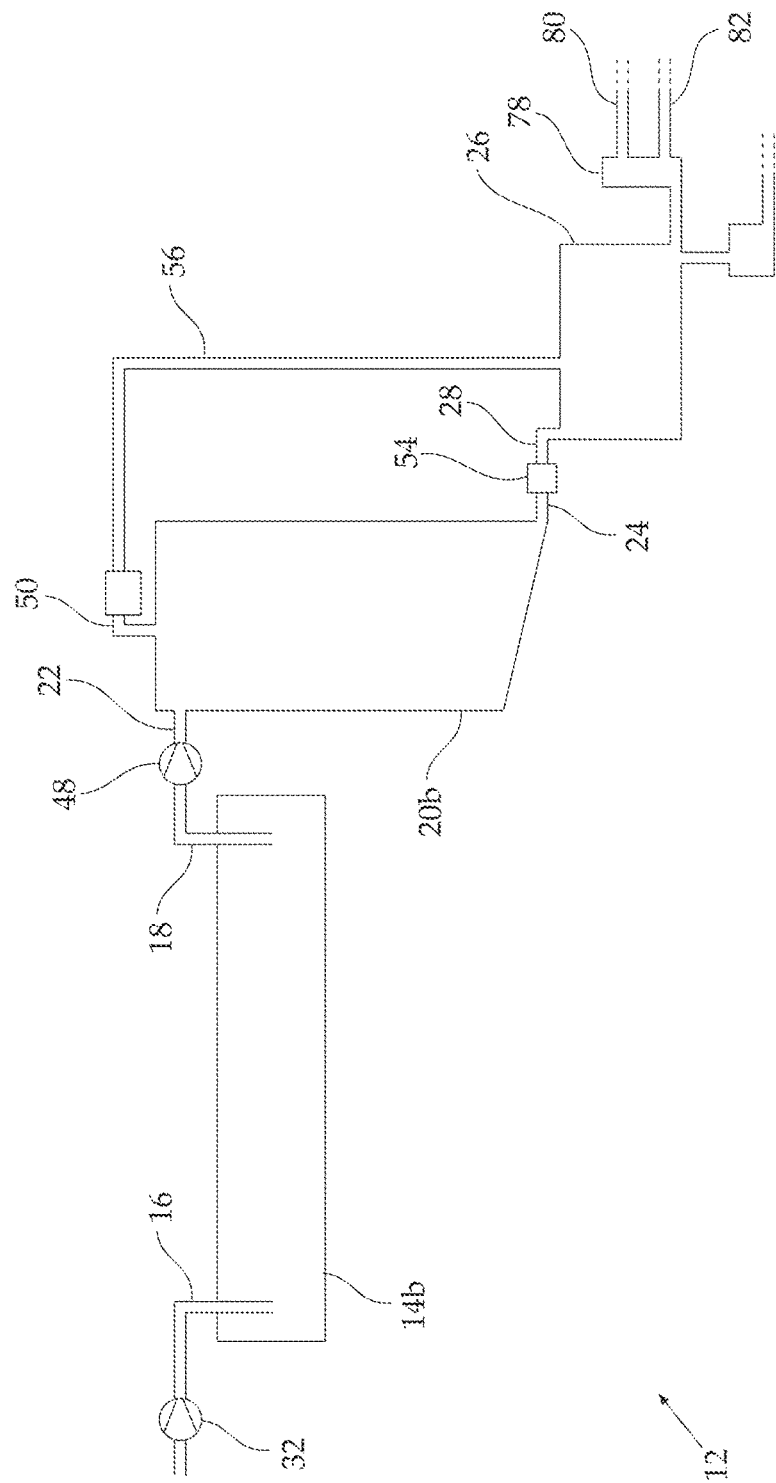
FIG. 2 is a schematic representation of a second embodiment 12 of a device according to the teachings herein.

Two embodiments of a device suitable for processing wastewater in accordance with the teachings herein are schematically depicted, device 10 in FIG. 1 and device 12 in FIG. 2.

Both device 10 and device 12 comprise an unactivated aerobic digester 14a and 14b, respectively, having an inlet 16 and an outlet 18; an anaerobic digester 20 having an inlet 22 and an outlet 24, which inlet 22 is functionally associated with unactivated aerobic digester outlet 18; and a photobioreactor 26 having an inlet 28, which inlet 28 is functionally associated with anaerobic digester outlet 24.

In some embodiments, a device further comprises, functionally associated with the unactivated aerobic digester inlet, a one-way valve: configured to allow fluid-flow into the unactivated aerobic digester through the unactivated aerobic digester inlet; and configured to prevent fluid-flow out of the unactivated aerobic digester through the unactivated aerobic digester inlet.

In some embodiments, a device further comprises a unactivated aerobic digester feed pump functionally associated with the unactivated aerobic digester inlet conduit for transferring wastewater into the unactivated aerobic digester.

In both device 10 and 12, functionally associated with inlet 16 of unactivated aerobic digester 14 is a unactivated aerobic digester feed pump 32 and a one-way valve 34, as described above.

As is discussed in greater detail hereinbelow, device 10 is configured for processing of industrial wastewater having relatively high organic content (BOD varying, typically from 400 mg/L to 800 mg/L). In contrast, device 12 is configured for processing of household sewage having organic content of up to about 400 mg/L, where the greater amount of wastewater is produced during the evening and night time when there is no sunlight.

Activated Aerobic Digester

In some embodiments, the device further comprises an activated aerobic digester having an outlet, which outlet is in fluid communication with the inlet of the unactivated aerobic digester, suitable for activated aerobic digestion of wastewater. Any suitable activated aerobic digester may be used, e.g., a fixed-film aerobic digester, a continuous-flow aerobic digester, a refluxed aerobic digester. In some preferred embodiments, the activated aerobic digester is configured for supporting a fixed-bed of bacteria. That said, in some embodiments, the activated aerobic digester is configured for supporting a floating-bed of bacteria.

In some such embodiments, a device further comprises a unactivated aerobic digester feed pump functionally associated with the unactivated aerobic digester inlet for transferring wastewater from the activated aerobic digester to the unactivated aerobic digester.

Device 10 includes an activated aerobic digester 36 which outlet 38 is functionally associated with inlet 16 of unactivated aerobic digester 14a. In device 10, unactivated aerobic digester feeder pump 32, is configured to pump wastewater from activated aerobic digester 36 into unactivated aerobic digester 14a. Activated aerobic digester 36 allows device 10 to be exceptionally useful for processing wastewater having a relatively high organic content.

Unactivated Aerobic Digester

A device according to the teachings herein includes any suitable unactivated aerobic digester.

In some embodiments, a unactivated aerobic digester is configured to operate at above-ambient pressures, typically up to 5% above ambient pressure. In some embodiments, the unactivated aerobic digester is substantially a sealed chamber. In some embodiments, the unactivated aerobic digester comprises an ordinarily-closed gas valve that opens to release excess gas when the pressure inside the unactivated aerobic digester passes a predetermined limit.

In some embodiments, a unactivated aerobic digester further comprises a gas outlet, configured for directing gas (that typically includes $CO_2$) released from the unactivated aerobic digester to the photobioreactor.

In some embodiments, a unactivated aerobic digester further comprises a gas inlet, configured for introducing gas into the unactivated aerobic digester. In some such embodiments, the gas inlet is functionally associated with the gaseous exhaust of an industrial process or internal combustion engine, to add effluent $CO_2$ and other gases produced by the industrial process or internal combustion engine, to wastewater in the unactivated aerobic digester. $CO_2$ in the introduced gas dissolves in the wastewater while $O_2$ in the introduced gas is consumed by aerobic microorganisms.

Typically, during use sludge settles at the bottom of a unactivated aerobic digester. In some embodiments, a unactivated aerobic digester includes a sludge remover, for removing sludge (settling at bottom of the unactivated aerobic digester) from the unactivated aerobic digester. In some embodiments, the sludge remover is configured to direct removed sludge to an activated aerobic digester, for example, an activated aerobic digester that is a component of the device.

In some embodiments, the unactivated aerobic digester is configured to operate as a continuous-stirred tank reactor. Such a unactivated aerobic digester typically includes a mixing mechanism such as an impeller (e.g., an axial-flow impeller, a radial-flow impeller) and is configured for use where the amount of wastewater transferred into the unactivated aerobic digester through the inlet is substantially equal to the amount of wastewater transferred from the unactivated aerobic digester through the outlet. The low $O_2$ content and low aerobic microorganism population component desired for wastewater transferred to the anaerobic digester from the unactivated aerobic digester is attained by ensuring that the amount of wastewater transferred into the unactivated aerobic digester is relatively small compared to the total volume of the unactivated aerobic digester and the rate of digestion therein and by ensuring sufficiently efficient mixing of the contents of the unactivated aerobic digester so newly-added wastewater (having a relatively high $O_2$ content and a relatively high aerobic microorganism population component) is quickly diluted with wastewater that has already undergone sufficient digestion.

Figure 3:
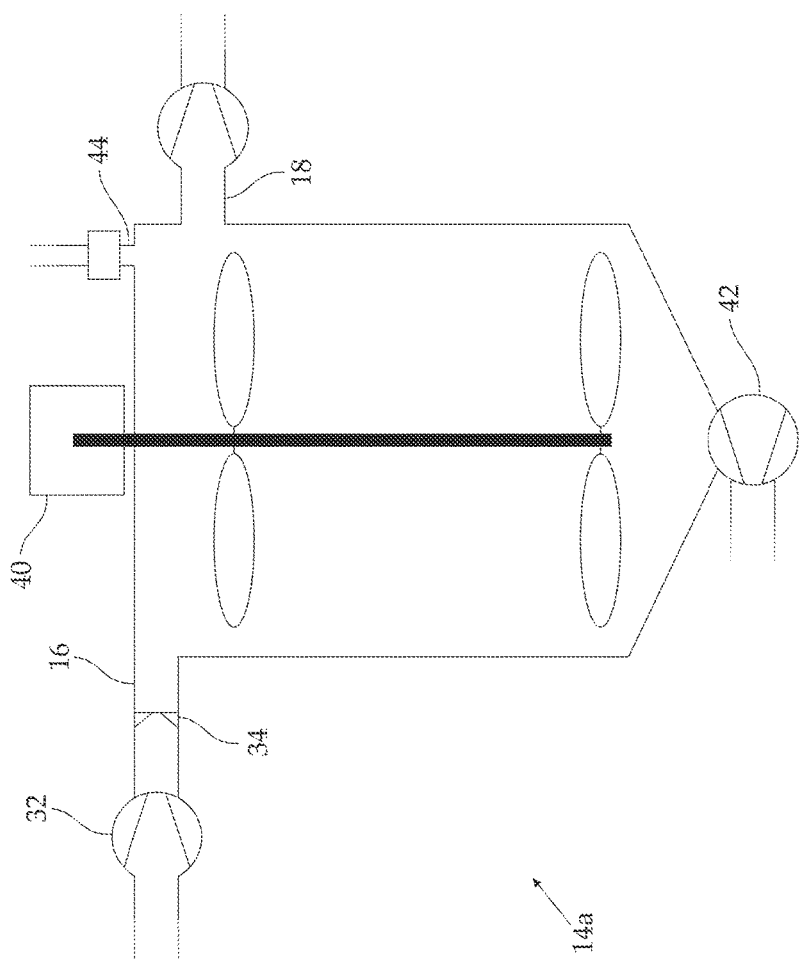
FIG. 3 is a schematic depiction of a first embodiment of an unactivated aerobic digester.

Device 10 includes a unactivated aerobic digester 14a, schematically depicted in greater detail in FIG. 3, configured to operate as a continuous-stirred tank reactor. Unactivated aerobic digester feeder pump 32 continuously transfers wastewater into unactivated aerobic digester 14a through inlet 16 to undergo unactivated aerobic digestion. Mixing mechanism 40 (comprising an impeller driven by a motor) continuously mixes wastewater in unactivated aerobic digester 14a so that additional wastewater transferred into unactivated aerobic digester 14a is quickly diluted with wastewater in unactivated aerobic digester 14a that has been already at least partially digested.

Unactivated aerobic digester 14a further comprises a sludge remover 42. Sludge remover 42 is configured, to remove sludge settling at the bottom of unactivated aerobic digester 14a from unactivated aerobic digester 14a and to direct the removed sludge to activated aerobic digester 36.

Unactivated aerobic digester 14a further comprises a gas outlet 44 configured for directing gas released from unactivated aerobic digester 14a to photobioreactor 26.

In some embodiments, the unactivated aerobic digester is configured to operate without mixing, that is to say, during use, wastewater flowing between the inlet and the outlet of the unactivated aerobic digester without any active mixing. As a given volume of wastewater flows between the inlet and the outlet, the wastewater undergoes digestion so that various gradients come into existence inside the wastewater in the unactivated aerobic digester. A gas gradient is formed where nearer the inlet there is a higher $O_2$ and lower $CO_2$ content while nearer the outlet there is a lower $O_2$ and higher $CO_2$ content. Importantly, a microorganism transition gradient is formed where going from the inlet to the outlet there is a transition from a microorganism population having a more significant aerobic microorganism component to having a less significant aerobic microorganism component. For this reason, the unactivated aerobic digester is sometimes called the transition digester. The low $O_2$ content and low aerobic microorganism population component desired for wastewater transferred to the anaerobic digester from the unactivated aerobic digester is attained both by the gradients and by ensuring that the amount of wastewater transferred into the unactivated aerobic digester is relatively small compared to the total volume of the unactivated aerobic digester and the rate of digestion therein.

Figure 4:
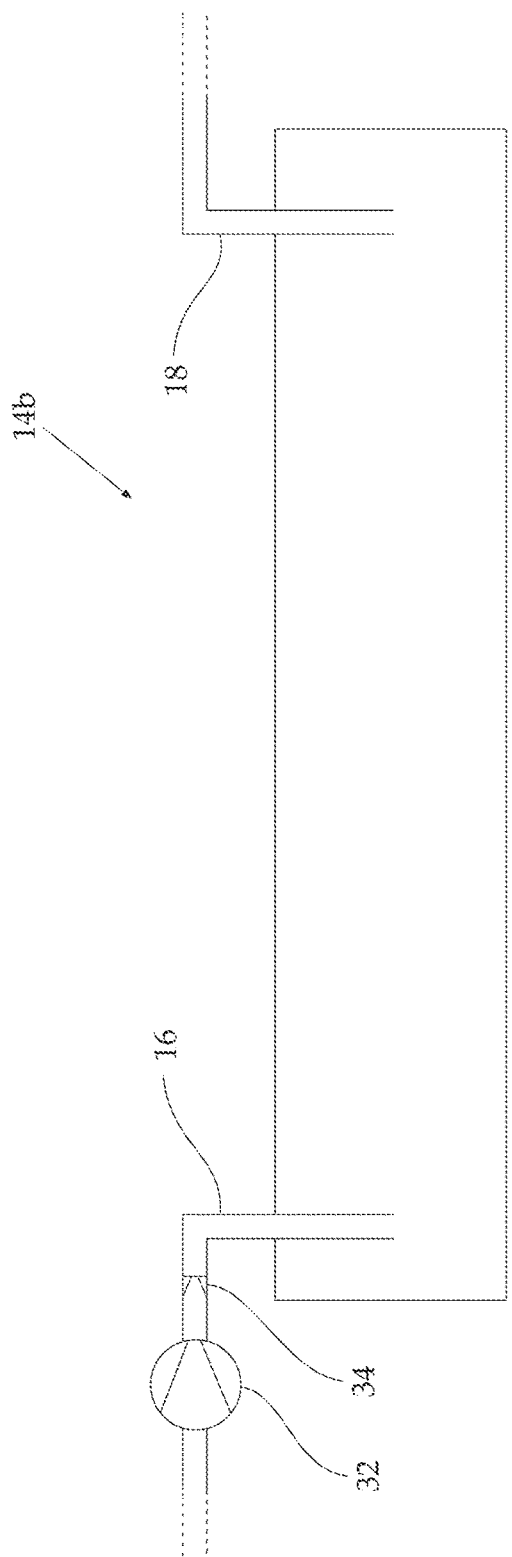
FIG. 4 is a schematic depiction of a second embodiment of an unactivated aerobic digester.

Device 12 includes an unactivated aerobic digester 14b, schematically depicted in greater detail in FIG. 4, configured to operate without mixing. Unactivated aerobic digester feeder pump 32 continuously transfers wastewater into unactivated aerobic digester 14b through inlet 16 to undergo unactivated aerobic digestion. As additional wastewater is transferred, wastewater that has already undergone at least some digestion in unactivated aerobic digester 14b is forced out through outlet 18. During use sludge may settle at the bottom of unactivated aerobic digester 14b. Such sludge remains in unactivated aerobic digester 14b and is slowly digested.

Anaerobic Digestion

A device according to the teachings herein includes any suitable anaerobic digester.

In some embodiments, an anaerobic digester is configured to operate at above-ambient pressures, typically up to 5% above ambient pressure. In some embodiments, the anaerobic digester is substantially a sealed chamber. In some embodiments, the anaerobic digester comprises an ordinarily-closed gas valve that opens to release excess gas when the pressure inside the anaerobic digester passes a predetermined limit.

In some embodiments, an anaerobic digester further comprises a gas outlet, configured for directing gas (that typically includes $CO_2$) released from the anaerobic digester to the photobioreactor. In devices 10 and 12, anaerobic digesters 20a and 20b respectively include such a gas outlet 50.

In some embodiments, a device further comprises, functionally associated with the anaerobic digester inlet, a one-way valve: configured to allow fluid-flow into the anaerobic digester through the anaerobic digester inlet; and configured to prevent fluid-flow out of the anaerobic digester through the anaerobic digester inlet. In devices 10 and 12, anaerobic digesters 20a and 20b respectively includes such a one-way valve 46.

In some embodiments, a device further comprises an anaerobic digester feed pump functionally associated with the anaerobic digester inlet for transferring wastewater from the unactivated aerobic digester to the anaerobic digester. In device 12, anaerobic digester 20b includes such an anaerobic digester feed pump 48.

That said, in some embodiments, an anaerobic digester inlet configured to passively direct wastewater exiting the unactivated aerobic digester outlet into the anaerobic digester. In some embodiments, wastewater entering the unactivated aerobic digester through the unactivated aerobic digester inlet, forces wastewater already in the unactivated aerobic digester out through the unactivated aerobic digester outlet through the anaerobic digester inlet into the anaerobic digester. In device 10, anaerobic digester inlet 22 is configured to passively direct wastewater exiting unactivated aerobic digester outlet 18 into anaerobic digester 20a.

Figure 5:
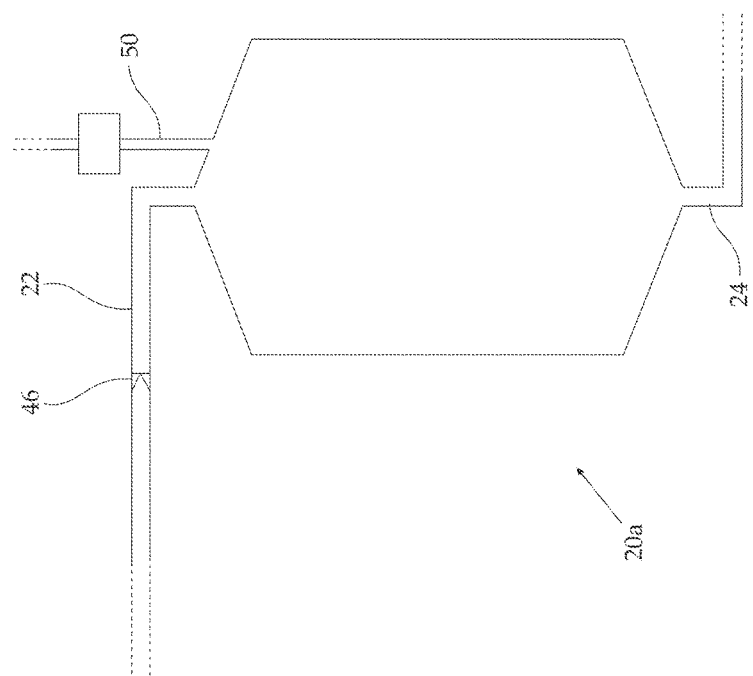
FIG. 5 is a schematic depiction of an embodiment of an anaerobic digester.

In some embodiments, the anaerobic digester is a vertically-stratified anaerobic digester 20a, schematically depicted in greater detail in FIG. 5 and anaerobic digester 20b. In such an anaerobic digesters, the anaerobic digester is substantially a vessel having inlet 22 near the top and outlet 24 near the bottom of the vessel. During operation, the contents of the vessel are not stirred or mixed allowing stratification of the wastewater in the vessel so that anaerobic digestion is substantially by the plug-flow method. As a given volume of wastewater flows between inlet 22 and outlet 24, the wastewater undergoes anaerobic digestion so that various gradients come into existence inside the wastewater. A gas gradient is formed where nearer the inlet there is a higher $O_2$ and lower $CO_2$ content while nearer the outlet there is a lower $O_2$ (substantially non-existent) and higher $CO_2$ content. Importantly, in some embodiments, a microorganism transition gradient is formed where going from the inlet to the outlet there is a transition from a microorganism population having some viable aerobic microorganism population component to having a no viable aerobic microorganism component. The substantially non-existent $O_2$ content and, if relevant no viable aerobic microorganism population component, desired for wastewater transferred to the photobioreactor from the anaerobic digester is attained both by the gradients and by ensuring that the amount of wastewater transferred into the anaerobic digester is relatively small compared to the total volume of the anaerobic digester and the rate of digestion therein.

In devices 10 and 12, anaerobic digester 20a and 20b, respectively, are vertically-stratified anaerobic digesters. Anaerobic digester 20b is configured to have an exceptionally large capacity for wastewater. Such a large capacity allows anaerobic digester 20b to store wastewater receives from unactivated aerobic digester 14 without transferring a similar amount of wastewater to photobioreactor 26. Such configuration is exceptionally useful in embodiments where a significant amount of wastewater is expected to be transferred to the device at times when there is insufficient sunlight for photobioreactor operation, for example at night.

In some embodiments, an anaerobic digester includes microorganism growth substrates (e.g., mats) allowing microorganisms therein to adopt a sessile mode during anaerobic digestion more favorably than a planktonic mode.

Photobioreactor

Figure 6:
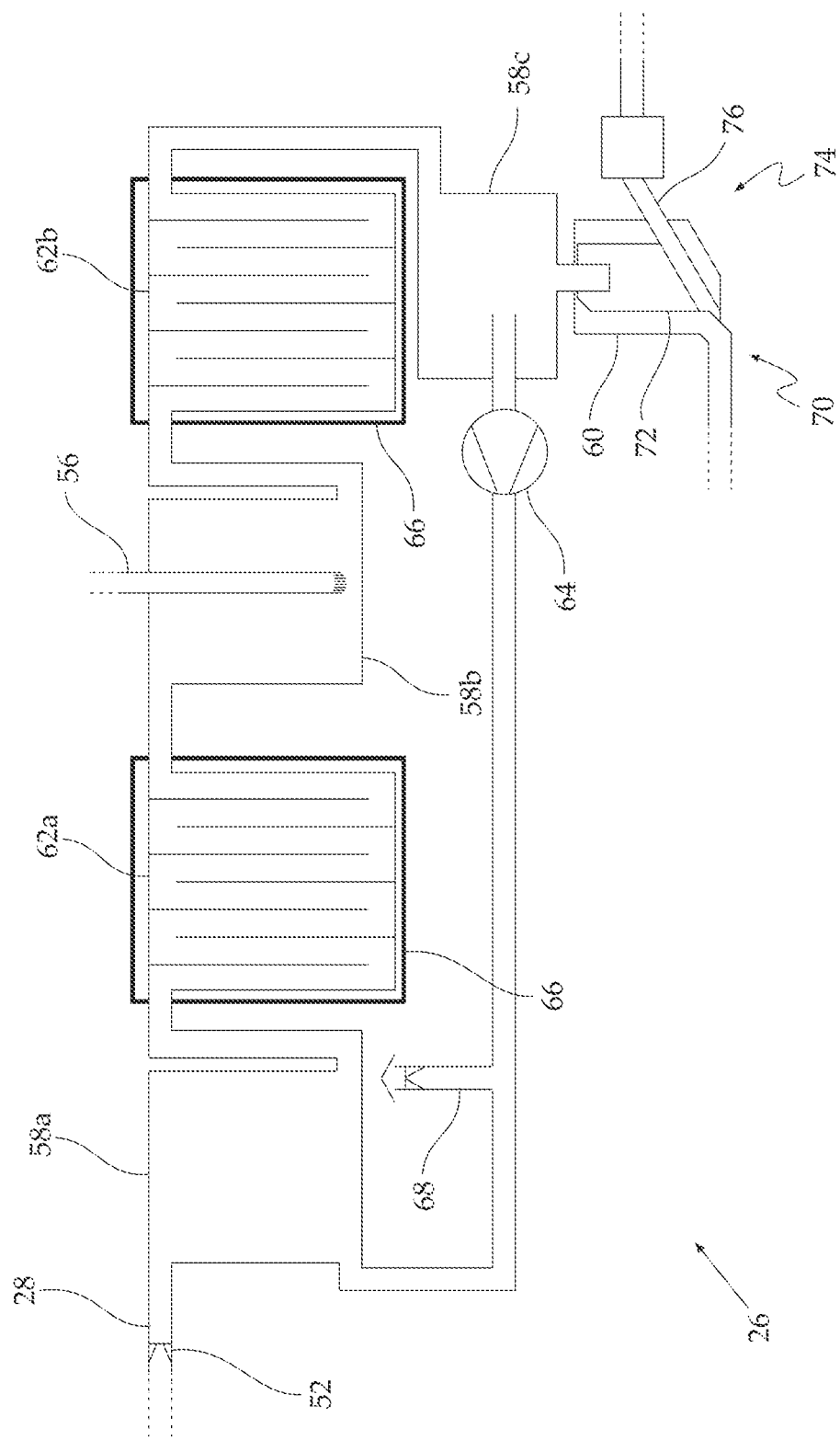
FIG. 6 is a schematic depiction of an embodiment if a photobioreactor.

A device according to the teachings herein includes any suitable photobioreactor. An embodiment of a photobioreactor 26 as implemented in device 10 and 12 is schematically depicted in greater detail in FIG. 6, and includes an inlet 28.

In some embodiments, a photobioreactor is configured to operate at above-ambient pressures, typically up to 5% above ambient pressure. In some embodiments, the photobioreactor comprises an ordinarily-closed gas valve that opens to release excess gas when the pressure inside the photobioreactor passes a predetermined limit.

In some embodiments, a device further comprises, functionally associated with the photobioreactor inlet, a one-way valve: configured to allow fluid-flow into the photobioreactor through the photobioreactor inlet; and configured to prevent fluid-flow out of the photobioreactor through the photobioreactor inlet. Some embodiments of photobioreactor 26 includes such a one-way valve 52.

In some embodiments, a device further comprises a photobioreactor feed pump functionally associated with the photobioreactor inlet for transferring wastewater from the anaerobic digester to the photobioreactor. Some embodiments of photobioreactor 26 include such a photobioreactor feed pump 54.

That said, in some embodiments, a photobioreactor inlet is configured to passively direct wastewater exiting the anaerobic digester outlet into the photobioreactor. In some embodiments, wastewater entering the anaerobic digester through the anaerobic digester inlet, forces wastewater already in the anaerobic digester out through the anaerobic digester outlet through the photobioreactor inlet into the photobioreactor. In some embodiments, photobioreactor inlet 28 is configured to passively direct wastewater exiting anaerobic digester outlet 24 into photobioreactor 26.

$CO_2$ Inlet

As discussed above, in some embodiments of the teachings herein, $CO_2$ gas is added to wastewater in a photobioreactor. Added $CO_2$ gas provides additional $CO_2$ for algal growth and also provides an alternative to releasing $CO_2$ into the atmosphere. Accordingly, in some embodiments, a photobioreactor further comprises a $CO_2$ inlet, configured for introducing $CO_2$ gas into the photobioreactor.

In some such embodiments, the $CO_2$ inlet is functionally associated with the anaerobic digester, to add $CO_2$ (and optionally other gases) produced inside the anaerobic digester, to wastewater in the photobioreactor.

In some such embodiments, the $CO_2$ inlet is functionally associated with the unactivated aerobic digester, to add $CO_2$ (and optionally other gases) produced inside the unactivated aerobic digester, to wastewater in the photobioreactor.

In some such embodiments, the $CO_2$ inlet is functionally associated with the gaseous exhaust of an industrial process or internal combustion engine, to add effluent $CO_2$ (and optionally other gases) produced by the industrial process or internal combustion engine, to wastewater in the photobioreactor.

Photobioreactor 26 includes a $CO_2$ inlet 56 for adding gases produced inside anaerobic digester 16 (typically $CO_2$ together with other gases) into photobioreactor 18.

Characteristics of Photobioreactor

In some embodiments, the photobioreactor constitutes a conduit having at least two distinct portions, at least one illumination portion (also called illumination vessel) and at least one holding portion (also called holding vessel), the illumination portion configured for exposing wastewater more intensely to sunlight than the holding portion. In some embodiments, an illumination portion constitutes a solar collector.

In some embodiments, a surface area to volume ratio of an illumination portion is substantially higher than a surface area to volume ratio of a holding portion. For example, an illumination portion is relatively thin but broad and high while the holding portion is more barrel-shaped or cubic.

As discussed above, according to some embodiments of the teachings herein, when algae is exposed to the sun, it is preferred that the optical path not be too long (as further algae are shaded from the sun) and not be too thin (giving the device unwieldy dimensions and rendering the device susceptible to clogging). Accordingly, in some embodiments, at least a portion of the photobioreactor defines an optical path for sunlight exposure not more than 5 cm long, not more than 4 cm long, not more than 3 cm long and even not more than 2.5 cm long. In some embodiments, the optical path for light exposure of not less than 0.5 cm, not less than 0.8 cm and even not less than 1 cm. Such a portion is typical a flat panel shape and, when deployed for use, the panel is fixed to face the sun as is known in the field of solar energy. Typically, the portion is the illumination portion.

In some embodiments, the illumination portion of the photobioreactor comprises a reflector to reflect light not absorbed by algae back through the illumination portion.

In some embodiments, the photobioreactor comprises a closed-circuit conduit, so that wastewater not removed from the photobioreactor can circulate in the photobioreactor indefinitely. In some embodiments, the photobioreactor is configured so that fluid flow therethrough is driven by fluid driven through the inlet of the photobioreactor. In some embodiments, the photobioreactor further includes a circulator (e.g., a circulation pump), configured to drive wastewater through the photobioreactor independently of fluid entering the inlet of the photobioreactor. Typically, the circulator is configured to circulate the entire volume of wastewater held in the photobioreactor over a period of between 3 hours and 7 hours, more typically over a period of between 4 hours and 5 hours.

As discussed above, according to some embodiments of the teachings herein, while held in a photobioreactor, algae is subjected to periods of quicker motion (stream) and to period of slower motion. Although not wishing to be held to any one theory, it is believed that such varying motion assists in maintaining the algae in planktonic mode, without developing swimming organs, yet without causing stress that may lead to algae death. In some embodiments, the photobioreactor constitutes a conduit, having: at least one portion of a first (larger) cross section; and at least one portion of a second cross section which is smaller in size than the first cross section, allowing a given alga to experience circulation through the photobioreactor at changing rates while maintaining substantially constant driving of flow over time, where:
  flow through portions having the first cross section is at a first rate; and
  flow through portions having the second cross section is at a second rate faster than the first rate.

In some embodiments, the second (smaller) cross section portions constitute at least 5%, at least 10%, at least 15% and even at least 20% of the volume of the photobioreactor. In some embodiments, the second (smaller) cross section portions constitute not more than 40% and even not more than 33% of the volume of the photobioreactor. The fraction of the time that a given alga has a faster flow rate is substantially the fraction of the volume of the photobioreactor having the second (smaller) cross section.

In some embodiments, portions of the second (smaller) cross sections correspond to the illumination portions and the portions of the first (larger) cross sections correspond to the holding portions of the photobioreactor.

Photobioreactor 26 includes a holding portion made up of three 1 m³ holding chambers 58 (each a 1 m×1 m×1 m cubic polyethylene vessel), first holding chamber 58a, second holding chamber 58b and third holding chamber 58c. Photobioreactor inlet 28 opens out into first holding chamber 58a. As an extraction chamber 60, a 80 cm diameter 1 m tall cylindrical vessel of polyethylene (having a volume of 500 L) is placed in fluid communication with and beneath third holding chamber 58c.

Photobioreactor 26 includes an illumination portion made up of two panels 62a and 62b, each panel 600 cm wide, 210 cm tall and 4 cm deep of 150 transparent Perspex (PMMA) or polycarbonate 4 cm×4 cm square cross section tubes 210 cm long, which ends are brought into fluid communication with U-shaped adapters so that each panel defines a 31.5 m serpentine conduit having a 16 cm² cross section and a 0.5 m³ volume. Each panel 62 constitutes a solar collector having a 4 cm long optical path, the depth of the tubes.

The inlet of panel 62a is functionally associated with the outlet of holding chamber 58a. The inlet of holding chamber 58b is functionally associated with the outlet of panel 62a. The inlet of panel 62b is functionally associated with the outlet of holding chamber 58b. The inlet of holding chamber 58c is functionally associated with the outlet of panel 62b. The inlet of holding chamber 58a is functionally associated with the outlet of holding chamber 58a. In such a way, photobioreactor constitutes a closed-circuit conduit. Wastewater can be driven through photobioreactor 26 by fluid driven into photobioreactor 26 through photobioreactor inlet 28, or by a circulator 64 (a circulation pump) that in part defines the functional association between holding chambers 58c and 58a. Circulator 64 has a pumping capacity of 16 L/minute, so can circulate an entire volume of wastewater held in photobioreactor 26 over a period of about 4 to 5 hours.

Panels 62 have a substantially higher surface area to volume ratio than holding chambers 58. Additionally, panels 62 have a much smaller flow cross section than do chambers 58. Accordingly, when wastewater is being pumped through photobioreactor 26 at a substantially constant driving rate, wastewater (and algae suspended therein) in chambers 58 moves slowly, for all intents and purposes does not move, while wastewater (and algae suspended therein) in panels 62 flows very quickly.

As noted above, in some embodiments when there is insufficient sunlight illuminating the photobioreactor, the algae in the wastewater may begin to adopt a non-photosynthetic metabolism. To assist in preventing this undesirable effect, in some embodiments a photobioreactor includes an illumination assembly, configured for illuminating at least a portion (typically the illumination portion) of the photobioreactor with artificial light. Any suitable artificial light may be used (e.g., LED, rope-light decorations, fluorescent lamps), as long as such light has sufficient intensity to assist in preventing the adoption of the non-photosynthetic metabolism. In some embodiments, an illumination assembly is functionally, associated with an ambient-light sensor to automatically activate the illumination assembly to illuminate the portion of the photobioreactor when there is insufficient ambient light.

In photobioreactor 26, each panel 62 of the illumination portion of photobioreactor 26 is functionally associated with such an illumination assembly 66, made of eighteen standard 210 cm-long fluorescent lamps.

In some embodiments, the photobioreactor includes a vent allowing release of gases produced during the processing of the wastewater in the photobioreactor. In some embodiments, the vent is a one-way vent valve (e.g., check valve) that allows escape of gases from the photobioreactor but prevents gases and contaminants from the surroundings from entering the photobioreactor. Photobioreactor 26 includes such a one-way vent valve 68.

As discussed above, in some embodiments of the teachings herein wastewater is purified. Specifically, in some embodiments wastewater, after undergoing unactivated aerobic digestion, anaerobic digestion and being transferred to and maintained in the photobioreactor in accordance with the teachings herein, is sufficiently pure, for example for discharge into the environment. Accordingly, in some embodiments, a device according to the teachings herein comprises a water extraction unit for extracting water, in some embodiments continuously, from the photobioreactor.

Any suitable water extractor may be used for extracting water from a photobioreactor in accordance with the teachings herein.

Photobioreactor 18 include a water extractor 70 associated with extraction chamber 60. Water entering third holding chamber 58c flows into extraction chamber 60 and passes through a filter 72 having a mesh size of 5 micrometers to be continuously extracted from photobioreactor 18 without substantial algal biomass.

In some embodiments, a water extractor further comprises a fine filter (e.g., of geotechnical cloth) for filtering extracted water.

In some embodiments, a water extractor further comprises an ultraviolet light for destroying algal spores found in extracted water by irradiation.

In some embodiments, a water extractor further comprises a sand trap to remove algae and/or destroyed algal spores.

As discussed above, some embodiments of the teachings herein require that the algal density in the wastewater in the photobioreactor be neither too high nor too low. In order to regulate the algal density, in some embodiments, a device as described herein further comprises an algae harvester (also called an algae extraction unit), functionally associated with the photobioreactor, for harvesting algal biomass from the photobioreactor. In some embodiments, the algae harvester is configured to continuously extract algal biomass from wastewater in the photobioreactor.

Any suitable algae harvester may be used in harvesting algae from wastewater from a photobioreactor in accordance with the teachings herein, for example with a skimmer, or an Archimedean screw.

Photobioreactor 18 includes an algae harvester 74 associated with extraction chamber 60. Some of the algae suspended in wastewater entering third holding chamber 58c settle into extraction chamber 60 to be continuously extracted from the wastewater by Archimedean screw 76.

In some embodiments, a device as described herein further comprises sensors (e.g., a sensor array) for monitoring the nutrient supply from the anaerobic digester as well as the conditions in the photobioreactor. In some embodiments, the sensors include at least one of an oxygen sensor, a carbon dioxide sensor, a temperature sensor, a pH sensor, a light sensor, and a conductivity sensor, algae density sensor.

As noted above, in some embodiments a device according to the teachings herein comprises an algae harvester to harvest algal biomass from wastewater in the photobioreactor. In some embodiments, harvested algae are taken from the device for further use or disposal.

In some embodiments, a device according to the teachings herein further comprises an algae separating unit to separate harvested algal biomass into a lipid stream and a solid stream. Any suitable algae separating unit may be used, for example and ultrasonic vibrator to rupture algae cells and/or a centrifuge to separate the lipids and solids from the ruptured cells. Devices 10 and 12 include an algae separating unit 78 to separate harvested algal biomass into a lipid stream 80 and a solid stream 82.

In some such embodiments, a device further comprises a fermenter that receives the solid stream from the algae separating unit and ferments received solids, for example, to produce bioethanol.

In some such embodiments, a device further comprises a fuel-extraction unit that receives the lipid stream from the algae separating unit and processes received lipids to produce biodiesel fuel.

In some such embodiments, a device further comprises an electrical generator configured to burn, inter alia, biodiesel fuel from the fuel extraction unit and generates electricity, for example, to power components of the device.

In some embodiments, a device further comprises a biological fuel-cell (microbial fuel cell) assembly optionally located between an anaerobic reactor and a photobioreactor.

In some embodiments, a device according to the teachings herein is provided as a plurality of modular units, which may be easily transported to a target location, and assembled on site.

Pretreatment

Although not depicted in the Figures, some embodiments of a device as described herein include a wastewater pretreatment module.

In some embodiments, a device further comprises a crusher for crushing solid components of wastewater prior to entry of the wastewater into the activated aerobic digester or the unactivated aerobic digester. Various crushers are known in the art. Any suitable crusher may be used.

In some embodiments, a device further comprises a solids separator (e.g., rake, net, sieve, strainer, solids-clearing conveyor belt) for separating solid components of wastewater prior to entry of the wastewater into the activated aerobic digester or the unactivated aerobic digester.

EXPERIMENTAL

A device, similar to device 10 depicted in FIG. 1 is constructed having a 35 $m^3$ volume unactivated aerobic digester, a 30 $m^3$ volume anaerobic digester and a 4 $m^3$ volume photobioreactor similar to 18 depicted in FIG. 5 with two 0.5 $m^3$ volume illumination chambers of transparent Perspex (PMMA) or polycarbonate, three 1 $m^3$ volume holding chambers and a 0.5 $m^3$ extraction chamber, all 4 of polyethylene. A pump is used to continuously drive wastewater having a BOD of 30 mg/L at a rate of 1 $m^3$/hour from an existing activated aerobic digestion pool of a waste water managing system serving a local industrial zone.

During daylight hours, algal biomass is harvested to maintain the algal density in the photobioreactor at between 15% and 20% by weight of the fluid inside the photobioreactor. Water is removed at a rate of 1 $m^3$/hour and found to have a BOD of between 2 and 5 mg/L. When dried, the algal biomass yields 70% lipids and 30% dry matter, by weight.

At night, the valve associated with the photobioreactor inlet is closed, the wastewater in the photobioreactor continuously circulated and the illumination chambers illuminated with standard fluorescent lamps.

At least some embodiments of the teachings herein, make use of both bacterial and photosynthetic processes, for treatment of various types of wastewater, including domestic and commercial sewage, industrial waste and surface runoff. Furthermore, the level of treatment may be greater than that achieved after known tertiary wastewater treatment processes.

Economic benefits of some embodiments of the teachings herein include: sustainable supply of reclaimed water; production of biofuels; and trade in greenhouse gas emissions:

some embodiments reduce greenhouse gas emissions by preventing $CO_2$ and water vapour emission during sludge decomposition stages, and by fixing $CO_2$ during algae photosynthesis.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

The invention claimed is:

1. A method for processing wastewater having an organic content comprising:
    a) providing wastewater comprising microorganisms for processing, wherein said wastewater is selected from the group consisting of domestic sewage, commercial sewage, industrial waste and surface runoff;
    b) reducing $O_2$ content of said wastewater by unaerated aerobic digestion by said microorganisms such that the O2 content of wastewater after said unaerated aerobic digestion is not more than 2 mg/L,
    changing the population of microorganisms in said wastewater from more aerobic microorganisms to fewer aerobic microorganisms,
    and transferring said wastewater with reduced $O_2$ content from said unaerated aerobic digestion to anaerobic digestion;
    c) subsequently to 'b', eliminating substantially all $O_2$ from said wastewater by said anaerobic digestion such that the population of aerobic microorganisms in said wastewater is no longer viable by the conditions of said anaerobic digestion;
    d) subsequently to 'c', transferring said wastewater to a photobioreactor,
    said photobioreactor closed to prevent microorganisms from the surroundings from entering said photobioreactor; and
    e) subsequently to 'd', maintaining said wastewater in said photobioreactor in conditions favorable for algal photosynthesis, thereby allowing algae to grow in said photobioreactor to provide purified water suitable for discharge into the environment,
    wherein the conditions in said photobioreactor are such that the algal population is predominantly planktonic algae,
    wherein the wastewater is circulated in said photobioreactor, and
wherein conditions of said transferring 'd' and/or said maintaining 'e' are such that subsequent to said maintaining 'e', the population of microorganisms from said anaerobic digestion in said wastewater is no longer viable.

2. The method of claim 1, further comprising, prior to said reducing of $O_2$ content 'b', reducing the organic content of said wastewater by activated aerobic digestion.

3. The method of claim 1, wherein at least one of said reducing of $O_2$ content by unaerated aerobic digestion 'b' and said eliminating of $O_2$ content by anaerobic digestion 'c' is performed in a closed vessel.

4. The method of claim 1, further comprising recovering $CO_2$ gas released by said anaerobic digestion and adding said recovered $CO_2$ gas to wastewater in said photobioreactor.

5. The method of claim 1, wherein said algae are native.

6. The method of claim 1, further comprising during said maintaining said wastewater in said photobioreactor 'e', at least one of circulating said wastewater in said photobioreactor discontinuously and circulating said wastewater in said photobioreactor continuously.

7. The method of claim 1, further comprising when there is insufficient sunlight to support sufficient photosynthesis, illuminating the wastewater in the photobioreactor with artificial light.

8. The method of claim 1, wherein said photobioreactor is operated at above ambient pressure.

9. The method of claim 1, further comprising when there is insufficient sunlight to support sufficient photosynthesis, circulating the wastewater in the photobioreactor.

* * * * *

UNITED STATES PATENT AND TRADEMARK OFFICE
CERTIFICATE OF CORRECTION

PATENT NO.        : 9,771,287 B2
APPLICATION NO.   : 14/115355
DATED             : September 26, 2017
INVENTOR(S)       : Yaakov Anker and Erez Katz It is certified that error appears in the above-identified patent and that said Letters Patent is hereby corrected as shown below:

On the Title Page

At Item (22), after PCT Files: delete "Jun. 5, 2012" and insert --May 6, 2012--

Signed and Sealed this
Seventh Day of November, 2017

Joseph Matal
*Performing the Functions and Duties of the*
*Under Secretary of Commerce for Intellectual Property and*
*Director of the United States Patent and Trademark Office*